United States Patent
Adachihara et al.

(10) Patent No.: US 8,417,097 B2
(45) Date of Patent: Apr. 9, 2013

(54) SCREEN RECORDING DEVICE, SCREEN RECORDING METHOD, AND INFORMATION STORAGE MEDIUM

(75) Inventors: Tadashi Adachihara, Kanagawa (JP); Hideaki Nishino, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 867 days.

(21) Appl. No.: 12/465,396

(22) Filed: May 13, 2009

(65) Prior Publication Data

US 2009/0317063 A1    Dec. 24, 2009

(30) Foreign Application Priority Data

Jun. 20, 2008    (JP) ................................. 2008-162592

(51) Int. Cl.
*H04N 9/80* (2006.01)
*H04N 5/93* (2006.01)
*G11B 27/00* (2006.01)

(52) U.S. Cl.
USPC ........... 386/252; 386/239; 386/240; 386/248; 386/278; 386/279; 386/282; 386/285; 386/286

(58) Field of Classification Search ................. 386/201, 386/205, 239–262, 278–290
See application file for complete search history.

(56) References Cited

U.S. PATENT DOCUMENTS

| | | | | |
|---|---|---|---|---|
| 5,966,496 A * | 10/1999 | Takimoto | ...................... | 386/240 |
| 6,594,442 B1 * | 7/2003 | Kageyama et al. | ........... | 386/253 |
| 6,966,065 B1 * | 11/2005 | Kitazato et al. | ............... | 725/116 |
| 7,289,723 B2 * | 10/2007 | Kikuchi et al. | ............... | 386/248 |
| 7,663,045 B2 * | 2/2010 | Schmidt et al. | ................. | 84/600 |
| 8,086,087 B2 * | 12/2011 | Kato | .............................. | 386/201 |
| 2002/0033889 A1 * | 3/2002 | Miyazaki | ...................... | 348/232 |
| 2004/0175117 A1 * | 9/2004 | Ando et al. | ..................... | 386/69 |
| 2005/0019003 A1 * | 1/2005 | Takeda | ............................ | 386/52 |
| 2006/0204214 A1 * | 9/2006 | Shah et al. | ...................... | 386/54 |
| 2007/0297767 A1 * | 12/2007 | Takei | .............................. | 386/96 |
| 2008/0089664 A1 * | 4/2008 | Sugiyama et al. | .............. | 386/94 |
| 2010/0226620 A1 * | 9/2010 | Sim | ................................. | 386/54 |

FOREIGN PATENT DOCUMENTS

| | | |
|---|---|---|
| EP | 0983782 A2 | 3/2000 |
| JP | 2005051706 | 2/2005 |

OTHER PUBLICATIONS

Partial translation of JP Office Action for corresponding JP Patent Application 2008-162592, dated Mar. 16, 2010.

* cited by examiner

*Primary Examiner* — Thai Tran
*Assistant Examiner* — Hung Dang
(74) *Attorney, Agent, or Firm* — Matthew B. Dernier, Esq.; Gibson & Dernier LLP

(57) ABSTRACT

Provided is a method capable of suppressing generation of data that needs to undergo a complicated copyright process for redistribution thereof. The method includes: executing a program and outputting and displaying a screen generated by the program; reproducing and outputting user-acquired audio acquired arbitrarily by a user; recording the screen output during a specified period along with the user-acquired audio, as video data; and restricting recording of the video data while the user-acquired audio is being output.

7 Claims, 5 Drawing Sheets

SCREEN RECORDING DEVICE, SCREEN RECORDING METHOD, AND INFORMATION STORAGE MEDIUM

BACKGROUND OF THE INVENTION

1. Field of the Invention

The present invention relates to a screen recording device, a screen recording method, and an information storage medium, and more particularly, to recording of a screen generated by a computer program.

2. Description of the Related Art

There is known a so-called screenshot function of storing an image of a screen generated by a computer program into storage means such as a hard disk drive or a semiconductor memory device according to a user's instruction during execution of the program. In this function, by performing a predetermined operation while viewing the screen on display, the user can cause a memory device to temporarily store the image of the screen. After that, the user sets a file name and specifies an arbitrary saving location on the hard disk drive to thereby cause a file of the image stored in the semiconductor memory device to be stored onto the hard disk drive. This function allows the user to later view the image of the screen displayed during execution of the program (see EP 983,782 A). There is also known a function of recording a screen being displayed during a specified period and an audio being output during the period as video data. This makes it possible to grasp, from the video data, not only what the output screen was but also what the output audio was.

SUMMARY OF THE INVENTION

Some computer systems can realize so-called multitasking, which allows a program specified to start by a user to be executed while a piece of music separately specified by the user is being reproduced and output. According to such a system, the user can perform an operation on the running program while listening to a desired piece of music.

However, in such a system, if the screen being displayed during the specified period and the audio being output during the period are recorded as described above, such video data is generated as to contain the screen of the program specified to start by the user and the piece of music separately specified by the user which is irrelevant to the program. However, this raises a problem in that such video data needs to undergo a complicated copyright process for redistribution thereof. This leads to a further problem in that, even if a creator of a program desires, it is difficult for the creator to make the program known more widely by permitting recording of a screen of the program and redistribution of the recorded data.

The present invention has been made in view of the above-mentioned problem, and an object thereof is to provide a screen recording device, a screen recording method, and an information storage medium, which are capable of suppressing generation of data that needs to undergo a complicated copyright process for redistribution thereof.

In order to solve the above-mentioned problem, a screen recording device according to the present invention includes: image display-outputting means for executing a program and displaying and outputting a screen generated by the program; user-acquired audio reproduction-outputting means for reproducing and outputting a user-acquired audio acquired arbitrarily by a user; video data recording means for recording the screen output during a specified period along with the user-acquired audio, as video data; and recording restricting means for restricting recording of the video data while the user-acquired audio is being output.

Further, a screen recording method according to the present invention includes: executing a program and displaying and outputting a screen generated by the program; reproducing and outputting a user-acquired audio acquired arbitrarily by a user; recording the screen output during a specified period along with the user-acquired audio, as video data; and restricting recording of the video data while the user-acquired audio is being output.

Further, an information storage medium according to the present invention stores a screen recording program for causing a computer to function as: image display-outputting means for executing the screen recording program and displaying and outputting a screen generated by the screen recording program; user-acquired audio reproduction-outputting means for reproducing outputting a user-acquired audio acquired arbitrarily by a user; video data recording means for recording the screen output during a specified period along with the user-acquired audio, as video data; and recording restricting means for restricting recording of the video data while the user-acquired audio is being output.

DETAILED DESCRIPTION OF THE INVENTION

Hereinafter, detailed description will be given of a preferred embodiment of the present invention based on the drawings.

Figure 1:
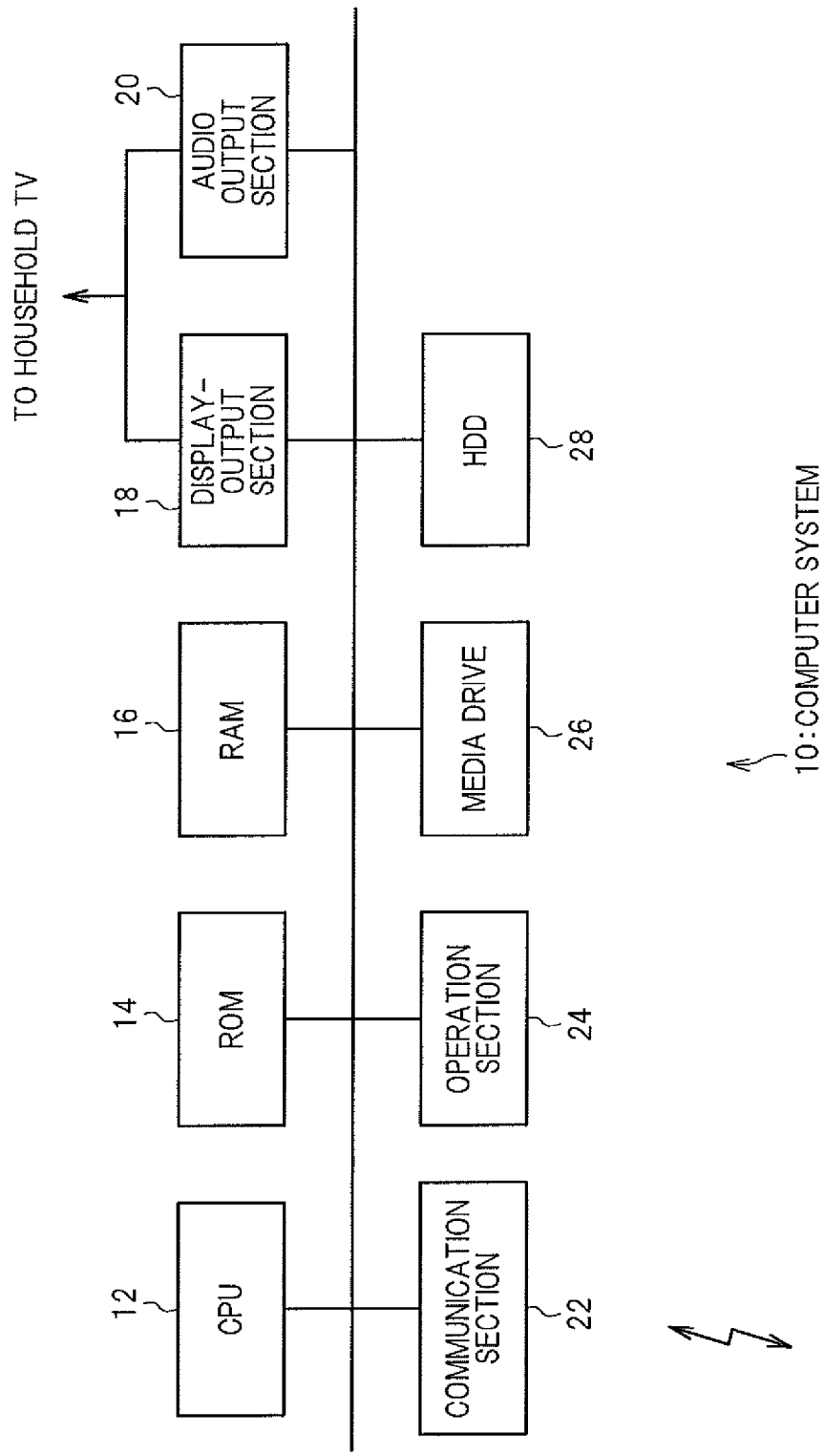
FIG. 1 is a hardware configuration diagram of a computer system that functions as a screen recording device according to an embodiment of the present invention.

FIG. 1 is a diagram illustrating a hardware configuration of a gaming device according to an embodiment of the present invention. In FIG. 1, a computer system 10 includes a CPU 12, a ROM 14, a RAM 16, a display-output section 18, an audio output section 20, a communication section 22, an operation section 24, a media drive 26, and a hard disk drive 28, and those components are connected to a bus and allowed to exchange data with each other.

Here, the CPU 12 controls each of the components of the computer system 10 by executing various programs stored in a portable storage medium that is received in the media drive 26 as described later, the hard disk drive 28, and the ROM 14. The ROM 14 stores a program such as a basic input/output system (BIOS). The RAM 16 is used as a work memory. The display-output section 18, which is configured by including a video RAM (VRAM), converts an image rendered in the VRAM by the CPU 12 into a video signal, and outputs the video signal to a household television receiver. Accordingly, an image (screen image) output from the computer system 10 is displayed on a screen of the household television receiver. The audio output section 20, which is configured by including an audio buffer, converts an audio data item stored in the audio buffer by the CPU 12 into an analog audio signal, and outputs the analog audio signal to the household television receiver. Accordingly, the audio output from the computer system 10 is output from an internal speaker of the household television receiver.

The communication section 22 is connected to a wide area network such as the Internet in a wired or wireless manner, and is used by the computer system 10 to perform data communications with another computer. The operation section 24 is configured by including a hand-held device provided with buttons and a cross key, and is used by a user to input an operation signal to the computer system 10 to perform various kinds of instruction. Under control of the CPU 12, the media drive 26 receives the portable storage medium such as a magneto-optical disk or a semiconductor memory, and reads data from the portable storage medium or writes data into the portable storage medium. Herein, various application programs including a game program are loaded into the computer system 10, or a music data item and image data are read from the portable storage medium into the computer system 10.

Figure 2:
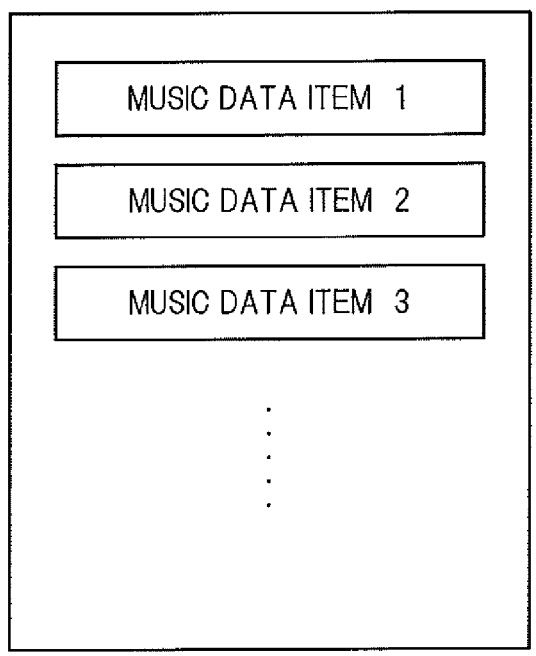
FIG. 2 is a diagram illustrating a group of music data items that are stored on a hard disk drive.
Figure 3:
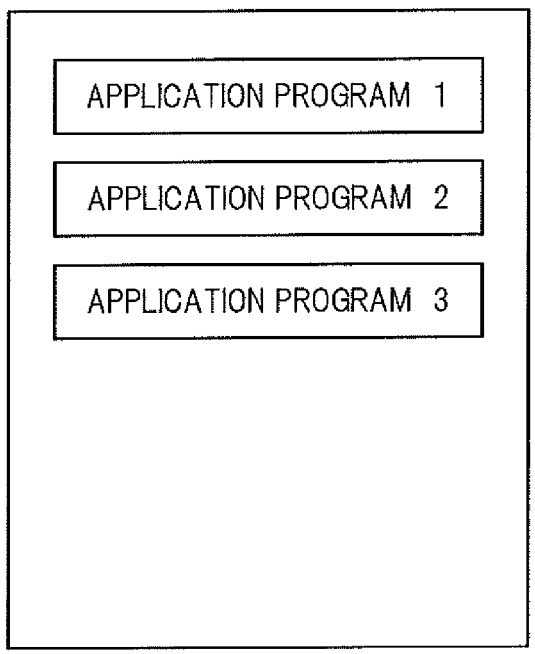
FIG. 3 is a diagram illustrating a group of application programs that are stored on the hard disk drive.

The hard disk drive 28 is a magnetic disk drive having a relatively large capacity. As illustrated in FIG. 2, the hard disk drive 28 stores thereon a plurality of music data items (user-acquired audio). Those music data items are obtained by being read from the portable storage medium or downloaded from another computer via a network by the communication section 22, and are reproduced and output by a BGM reproduction program described later. Further, as illustrated in FIG. 3, the hard disk drive 28 also stores thereon a plurality of application programs. Those application programs are also obtained by being read from the portable storage medium or downloaded from another computer via a network by the communication section 22. The user can arbitrarily selectively execute the application program by using the operation section 24. Note that in general, the music data items and the application programs are produced by different persons or corporations, with the copyrights belonging to different copyright owners. The music data items are arbitrarily obtained via a network or from the portable storage medium by the user, separately from the application programs.

Figure 4:
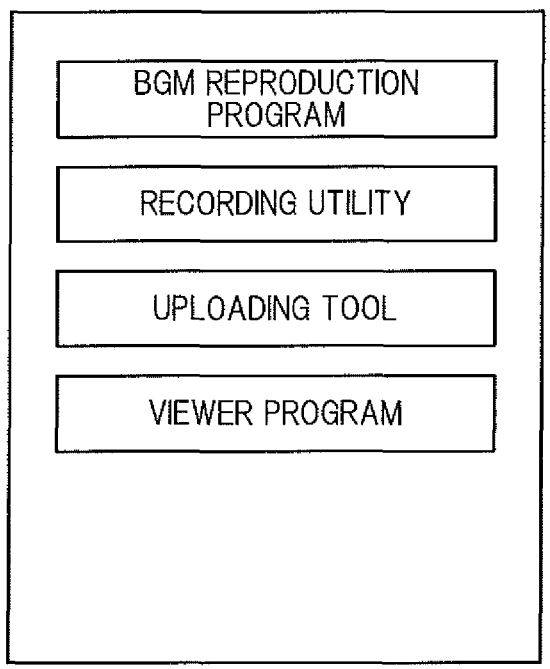
FIG. 4 is a diagram illustrating a group of system programs that are stored on the hard disk drive.

Further, as illustrated in FIG. 4, the hard disk drive 28 stores thereon an operating system and various other system programs. The BGM reproduction program illustrated in FIG. 4 is used for reproducing a selected one of the music data items illustrated in FIG. 2 as background music (BGM) during execution of one or a plurality of application programs illustrated in FIG. 3. In other words, the BGM reproduction program is executed in parallel with those application programs. The BGM reproduction program is started according to a user's instruction during the execution of the application program. In a case where a music data item is reproduced by the BGM reproduction program, audio may be stopped from being output from the application program itself. Alternatively, the music data item (user-acquired music) serving as the BGM and the audio being output from the application program itself may be mixed before outputting thereof. In this case, the application program may output only partial audio assigned a higher priority, and may stop outputting audio assigned a lower priority. This allows the audio assigned a higher priority output by the application itself to be output while being mixed with the music data item serving as the BGM.

A recording utility is a program for recording an image being output from the display-output section 18 and audio being simultaneously output from the audio output section 20 onto the hard disk drive 28 as video data (audio-containing moving image data). The video data recorded on the hard disk drive 28 is made available for the user's personal viewing by being reproduced and output to the household television receiver by a viewer program, or made available for another user's viewing by being transmitted to another computer via the communication section 22 and the network by an uploading tool.

The recording utility is executed by the application program illustrated in FIG. 3 as its child process as necessary, and according to an instruction issued from the application program, starts to record the video data constituted of a pair of the image output from the display-output section 18 and the audio output from the audio output section 20. According to another instruction issued from the application program, the recording utility ends recording of the video data. According to a further instruction issued from the application program, the recording utility retains a BGM reproduction flag and a BGM recording flag. The BGM reproduction flag indicates whether or not the music data item is allowed to be reproduced and output as the BGM during the execution of the application program. The BGM recording flag indicates whether or not a screen of the application program is allowed to be recorded in a case where the music data item is being reproduced and output as the BGM.

Figure 5:
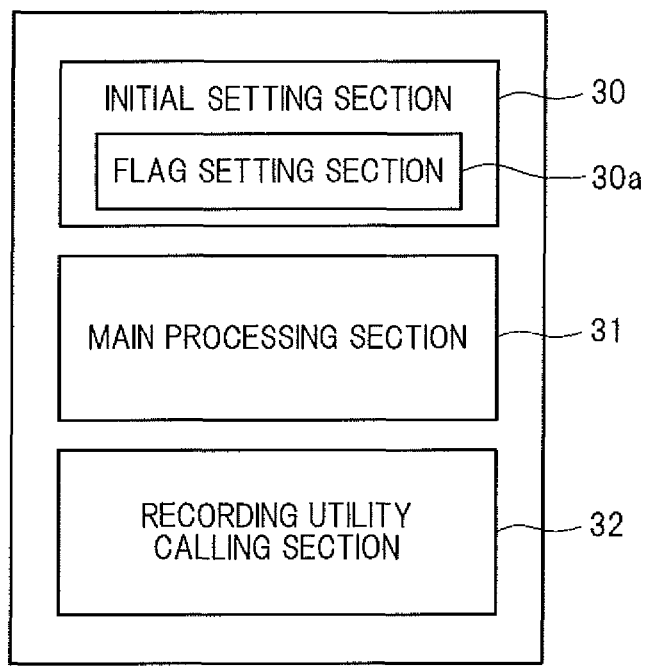
FIG. 5 is a configuration diagram of an application program.

In other words, as illustrated in FIG. 5, all or some of the application programs are configured by including an initial setting section 30, a main processing section 31, and a recording utility calling section 32, and at a time of starting program execution, the initial setting section 30 first performs various initial settings. In particular, the initial setting section 30 includes a flag setting section 30a, which writes values of the above-mentioned BGM reproduction flag and BGM recording flag into, for example, the RAM 16. In an example case where the creator of the application program permits the reproduction of the BGM during the execution of the application program but wishes to prohibit the recording of the screen while the BGM is being output, the BGM reproduction flag as "1" (permit reproduction) and the BGM recording flag as "0" (prohibit recording) are written into the RAM 16. The BGM reproduction program and the recording utility reference those flags to appropriately restrict the reproduction of the music data item during execution of the application program.

When the initial setting section 30 finishes the various initial settings, the main processing section 31 executes the processing of the application. Examples of the application include a video game. The recording utility calling section 32 is started when a predetermined operation is performed on the operation section 24 during execution of the application program, and instructs the recording utility to start recording or stop recording.

Figure 6:
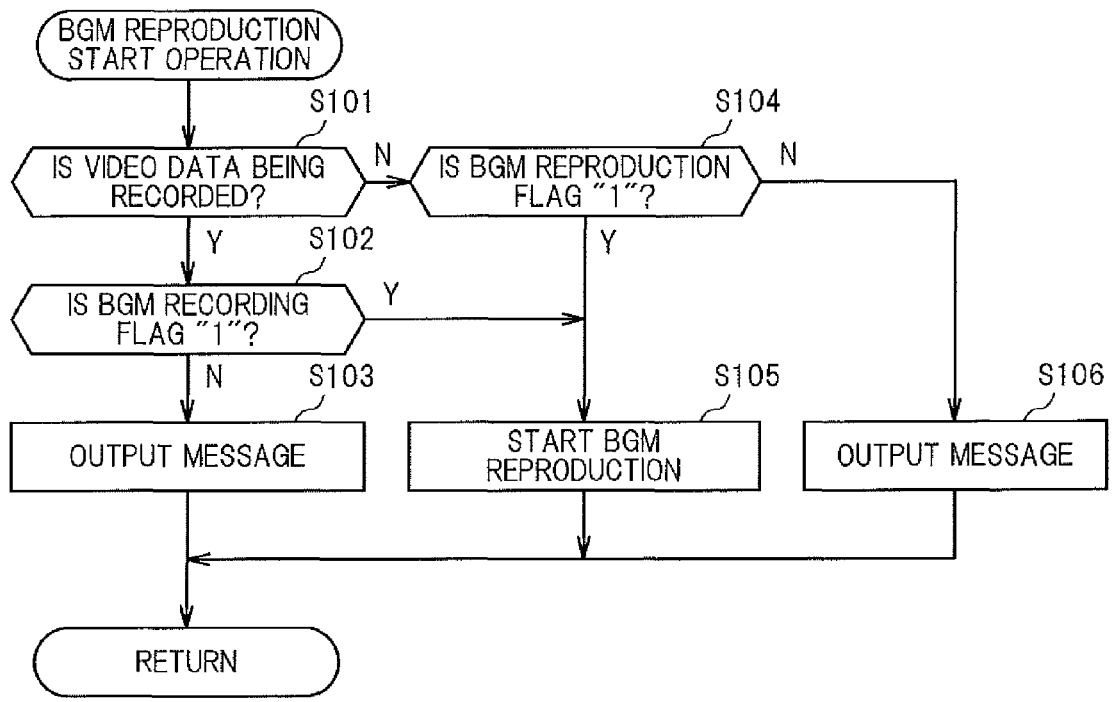
FIG. 6 is a flowchart illustrating processing in a case of performing a background music (BGM) reproduction start operation.

FIG. 6 is a flowchart illustrating processing of the BGM reproduction program in a case where the BGM reproduction program is started according to the predetermined operation during execution of the application program. The BGM reproduction program first judges whether or not video data is currently being recorded by the recording utility (S101). Then, if being recorded, the BGM reproduction program references the BGM recording flag stored in the RAM 16 (S102). If the BGM recording flag is "0" (prohibit recording), the BGM reproduction program outputs, for example, the message "BGM cannot be reproduced during recording." (S103), and brings the processing to an end. At this time, the BGM reproduction program may store the fact that the start of the BGM reproduction is postponed, and start the BGM reproduction after the recording is finished. On the other hand, if the BGM recording flag is "1" (permit recording), the BGM reproduction program reads a music data item selected by the user or selected at random, and reproduces the music data item as the BGM (S105).

If it is judged in Step S101 that the video data is not being recorded, the BGM reproduction program references the BGM reproduction flag (S104). Then, if the BGM reproduction flag is "1" (permit reproduction), the BGM reproduction program reads a music data item selected by the user or selected at random, and reproduces the music data item as the BGM (S105). At this time, the BGM reproduction program may instruct the application program to stop the outputting of a part (a part of the audio assigned a lower priority, for example) or all of the audio being output by the application program itself. On the other hand, if the BGM reproduction flag is "0" (prohibit reproduction), the BGM reproduction program outputs a message such as "Music cannot be reproduced during execution of the application." (S106), and brings the processing to an end. Also at this time, the BGM reproduction program may store the fact that the start of the BGM reproduction is postponed, monitor whether or not the BGM reproduction flag is rewritten to "1" during the execution of the application program, and if rewritten to "1", start the BGM reproduction based on results of the processing of Step S101 and the subsequent steps. The above processing makes it possible to restrict the BGM reproduction during the recording based on the value of the BGM recording flag. This can suppress generation of the video data that contains the image of the application program and a music data item that is not relevant to that image and needs to undergo a complicated copyright process for redistribution thereof.

Figure 7:
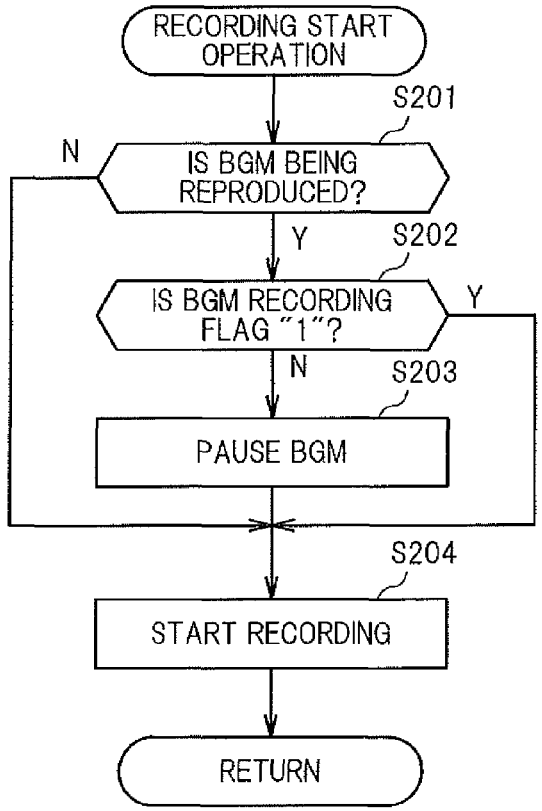
FIG. 7 is a flowchart illustrating processing in a case of performing a recording start operation.

FIG. 7 is a flowchart illustrating processing of the recording utility in a case where the application program instructs the recording utility to start the recording through the operation section 24. As illustrated in FIG. 7, the recording utility first judges whether or not BGM is being reproduced (S201). If the BGM is being reproduced, the recording utility next references the BGM recording flag (S202). At this time, if the BGM recording flag is "0" (prohibit recording), the recording utility pauses the BGM reproduction (S203). In this case, reproduction conditions including a current reproduction position and a current reproduction volume are saved in the RAM 16. Further, in a case where a restriction is imposed on the audio output by the application itself at the start of the BGM reproduction, the recording utility removes the restriction. After that, the recording utility starts to record the application screen (S204). If it is judged in Step S201 that the BGM is not being reproduced, the recording utility skips the processing of Steps S202 and S203, and immediately starts to record the application screen (S204). Further, if it is judged in Step S202 that the BGM recording flag is "1" (permit recording), the recording utility skips the processing of Step S203, and starts to record the application screen while continuing the BGM reproduction (S204). In this case, the video data that contains the image of the application and the music of the music data item is recorded onto the hard disk drive 28.

Figure 8:
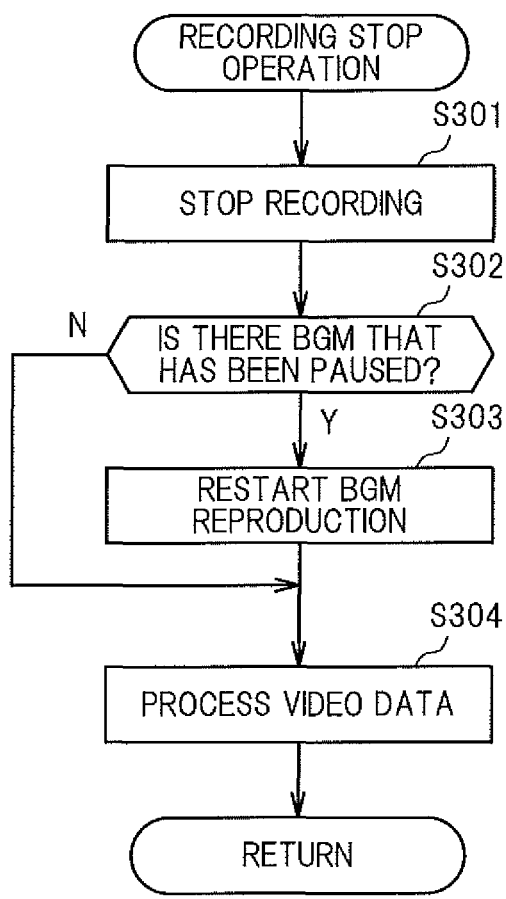
FIG. 8 is a flowchart illustrating processing in a case of performing a recording stop operation.

FIG. 8 is a flowchart illustrating processing of the recording utility in a case where the application program instructs the recording utility to end the recording. As illustrated in FIG. 8, the recording utility immediately stops the recording of the video data (S301), and then judges whether or not there is a music data item whose reproduction has been paused in the processing of Step S203 illustrated in FIG. 7 (S302). Then, if there is such a music data item, the recording utility reads the reproduction condition saved in the RAM 16, and restarts the reproduction of the music data item (S303). In this case, it is desirable to restart the reproduction of the music data item from a position where the reproduction was paused, with a volume set when the reproduction was paused. If it is judge in Step S302 that there is no music data item whose reproduction has been paused, the processing of Step S303 is skipped. After that, the recording utility performs postprocessing of the recorded video data (S304). For example, the recording utility stores the video data onto the hard disk drive 28, or transmits the video data to an external computer through the communication section 22. The recording utility may decide what kind of postprocessing is to be performed according to the user's instruction. Note that a method for the postprocessing of the video data which is desired by the user may be stored in advance (before the video data is recorded), and the video data may be subjected to the postprocessing based on that method. At this time, the recording utility may cause the flag setting section 30a to set the BGM recording flag depending on what kind of method for the postprocessing is stored, for example, to set the BGM recording flag to "0" (prohibit recording) if the stored method for the postprocessing is the transmission of the video data to an external computer, and otherwise set the BGM recording flag to "1" (permit recording).

According to the embodiment described above, the application program specified by the user through the operation section 24 is executed, and when a screen is generated by the program, the screen is output and displayed on the household television receiver. Further, it is possible, using the BGM reproduction program, to reproduce an arbitrary piece of music as BGM, and output the BGM through the household television receiver. Further, it is possible, with the recording utility, to record, as the video data, the screen output during a specified period along with the audio. At this time, the recording of the video data while the audio is being output is restricted based on the value of the BGM recording flag, which makes it possible to restrict the generation of the video data that needs to undergo a complicated copyright process for redistribution thereof. To be specific, the reproduction and outputting of a piece of music is set to be rejected if the reproduction and outputting of the piece of music is instructed during the recording of the screen, or the outputting of a piece of music is stopped when the recording of the video data is started while the piece of music is being output. At this time, by restarting outputting of the piece of music at the end of the recording of the video data, it is possible to improve convenience to the user.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A screen recording device, comprising:
   image display output means for executing a program and outputting and displaying a screen generated by the program;
   user-acquired audio reproduction and outputting means for reproducing and outputting user-acquired audio acquired arbitrarily by a user, according to a user's operation for a reproduction instruction;
   video data recording means for recording the screen output, which is output by the image display output means, and the user-acquired audio, which is output by the user-acquired audio reproduction and outputting means, during a specified period as video data; and recording restricting means for restricting recording of the video data while the user-acquired audio is being output.

2. A screen recording device according to claim 1, further comprising transmission means for transmitting the video data to another device via a network.

3. A screen recording device according to claim 1, wherein the recording restricting means rejects reproduction and outputting of the user-acquired audio when the reproduction and outputting of the user-acquired audio is instructed during the recording of the video data.

4. A screen recording device according to claim 1, wherein the recording restricting means stops outputting of the user-acquired audio when the recording of the video data is started while the user-acquired audio is being output.

5. A screen recording device according to claim 4, wherein the recording restricting means restarts the outputting of the user-acquired audio when the recording of the video data is brought to an end.

6. A screen recording method, comprising:
   executing a program, and outputting and displaying a screen generated by the program;
   reproducing and outputting user-acquired audio acquired arbitrarily by a user;
   recording the screen output, which is output during the execution of the program, and the user-acquired audio, which is output during the reproducing and outputting of the user-acquired audio, during a specified period along with the user-acquired audio, as video data; and
   restricting recording of the video data while the user-acquired audio is being output.

7. A non-transitory, computer-readable information storage medium for storing a program for causing a computer to function as:
   image display output means for executing the program and outputting and displaying a screen generated by the program;
   user-acquired audio reproduction and outputting means for reproducing and outputting user-acquired audio acquired arbitrarily by a user;
   video data recording means for recording the screen output, which is output by the image display output means, and the user-acquired audio, which is output by the user-acquired audio reproduction and outputting means, during a specified period along with the user-acquired audio, as video data; and
   recording restricting means for restricting recording of the video data while the user-acquired audio is being output.

* * * * *